April 22, 1958  M. A. FURBUSH ET AL  2,831,920
TELEVISION CAMERA HEATING SYSTEM
Filed Sept. 1, 1955
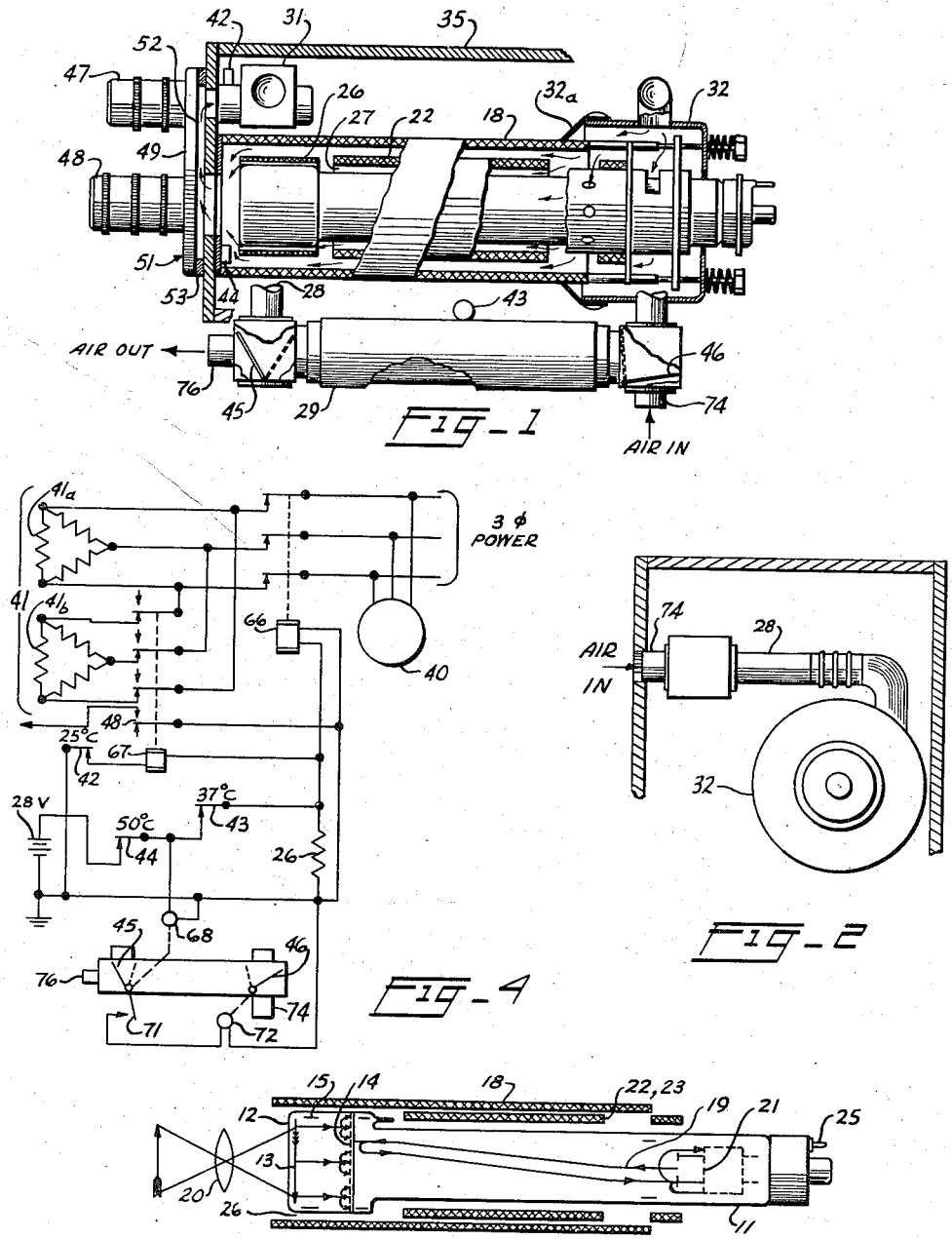
INVENTOR.
MERRILL A. FURBUSH
DAVID B. SHAW
BY
H. S. Mackey
ATTORNEY

United States Patent Office 2,831,920
Patented Apr. 22, 1958

2,831,920

TELEVISION CAMERA HEATING SYSTEM

Merrill A. Furbush, Mamaroneck, and David B. Shaw, White Plains, N. Y., assignors to General Precision Laboratory Incorporated, a corporation of New York Application September 1, 1955, Serial No. 531,959

4 Claims. (Cl. 178—7.2)

This invention relates to an improved temperature control system and more particularly to a system for regulating and controlling the starting and operating temperature of a video pick-up tube of a television camera.

There are in the prior art, many temperature control systems intended to regulate the temperature of various types of electron discharge devices. However, in these prior systems problems were involved different from those in the present instance because of the special characteristics of the electrodes used in the latter.

The present invention particularly relates to a temperature control system for a video camera pick-up tube having a photosensitive image screen electrode which is a piece of glass coated with a volatile metal, such as cesium, and a target which is a delicate piece of temperature-sensitive glass. The target is the heart of the video tube and the resistivity of the glass of this electrode is highly temperature sensitive. Below the normal operating temperature the higher resistivity produces a "sticking" picture and above the normal operating temperature the picture resolution deteriorates rapidly. The cesium of the image screen boils at approximately 90° C. and there is a great tendency of its vapor to migrate to points of lower temperature. The vaporization varies with absolute temperature so that a greater temperature differential between electrodes within the tube may be tolerated at lower temperatures than at higher temperatures. In order to prevent the cesium vapor from migrating certain maximum temperatures as well as certain maximum temperature differentials must be maintained. On the other hand, it is necessary that the pick-up unit reach normal operating temperature before it is operated and it is desirable that it reach this temperature with minimum delay.

Accordingly, the primary object of this invention is to provide an improved system for maintaining the temperature difference between points in a video pick-up tube within selected limits dependent upon the absolute temperature while the tube is being subjected to a very wide range of external ambient temperatures.

Another object is to provide a system for preheating the pick-up tube to bring it up to normal operating temperature with a minimum time delay, while maintaining the aforesaid temperature differential and providing cooling action to prevent damage to the tube.

Other and further objects will become apparent from the following description when taken in consideration with the accompanying drawings, in which:

Figure 1 is a partially exploded, partial plan sectional view of the improved temperature control system in accordance with the present invention;

Figure 2 is a rear end elevational view of Fig. 1;

Figure 3 is a cross-sectional view of the video pick-up tube; and

Figure 4 is a schematic circuit diagram in accordance with the invention.

In the embodiment of the invention illustrated in the drawings, means are provided for supplying heat when the temperature of the video tube is below its normal operating temperature and further means are provided for distributing the internal heat and for cooling the tube as soon as the tube reaches normal operating temperature. The novelty herein resides in the particular arrangement of parts whereby a selected temperature differential between the points in the tube are so controlled as to prevent deterioration of the tube regardless of ambient external temperatures within the range from —55° C. to +50° C.

Although the invention is applicable to any type of tube which would be benefited by the capabilities of this invention, the invention is illustrated in connection with a video tube commonly referred to as an image orthicon tube, Fig. 3, comprising a long slender glass envelope 11 having an enlargement 12 at one end to accommodate an image screen 13 and an associated target electrode 14. The image screen 13 is a semi-transparent photocathode which is coated with cesium, a very volatile photosensitive metal. The target electrode 14 consists of a thin glass disc with a very fine mesh screen closely adjacent the glass disc on the photocathode side. A grid 15 is provided for supplying a suitable electrostatic accelerating field. Light from the scene being televised is picked-up by an optical lens system 20 and focused on the image screen 13 which emits electrons from each elemental area in proportion to the intensity of the light striking the area. The streams of electrons from the image screen 13 are focused on the target 14 by the electrical field produced by the potentials of the grid 15 and the image screen 13 relative to the target 14 and by the magnetic field of a focusing coil 18.

When the electrons from the image screen 13 strike the target 14 they cause secondary electrons to be emitted by the latter. These secondary electrons are collected by the adjacent mesh screen, leaving on the side of the target 14 facing the image screen 13 a pattern of positive charges which corresponds with the pattern of light from the scene being televised. This causes a similar pattern of equal and opposite charges to be set up on the opposite side of the glass disc target 14. This latter pattern of charges is translated into a modulated electrical current, constituting the video output, by means of a scanning electron beam 19 from an electron gun 21, whereby the respective charges are sequentially applied to the video output terminal 25. This beam is focused by means of the focusing coil 18 surrounding the glass envelope and is caused to scan over the surface of the target electrode 14 by means of the orthogonal magnetic fields of two pairs of deflection coils 22 and 23, in a manner well understood in the television art.

Since cesium boils at approximately 90° C. the cesium-coated image screen 13 is very temperature-sensitive and would be almost instantly destroyed above +90° C. The evaporation of cesium varies with the temperature so that the temperature differential between points in the tube may be greater at lower than at higher temperatures without deteriorating migration of the cesium taking place. On the other hand, operation of the tube at a temperature of approximately +25° C. or lower will be characterized by the appearance of rapidly disappearing "sticking pictures" of opposite polarity from the original when the scene is moved. It thus becomes quite obvious that if the device is to operate properly it must have the proper temperature. Often the target and screen are below this temperature at starting. At these low temperatures the image screen may be considerably hotter than the target without appreciable migration of the cesium. As the target approaches operating temperature the temperature differential must be reduced to a range of about 5° C. The heating system of the present invention utilizes this characteristic to reduce the time required to reach operating temperature by gradually decreasing the temperature differential as the image screen approaches operating temperature. This allows the base of the tube to be much hotter than the image end when the temperature of the image screen is low, such as when the tube is being started into operation in low ambient temperatures.

The control and distribution of the heat is effected through a confined convection path which includes the cylindrical space 27 between the tube 11 and the deflecting coils 22, 23. This closed loop also includes a conduit 28, a cylindrical conduit housing 29 which contains a heater 41 shown in the circuit diagram of Fig. 4, a blower casing 31 enclosing a fan (not shown) and a shroud 32 having an airtight seal 32a with the small end of the tube 11 and the outside of the focusing coil 18.

The heater 41 in the conduit housing 29 constitutes the main source of heat for bringing the video tube 12 up to operating temperature or maintaining the temperature when operating in low ambient temperatures. The supplemental heater 26 is designed to compensate for the temperature drop in the air passing from the base end to the image section end of the video tube to maintain all points of the tube within the 5° C. temperature differential. The location and relative position of the components is for the definite purpose of permitting very fast warming of the tube at the beginning of its operation and for doing it in such a manner that the temperature differential tapers off to the 5° C. differential as the temperature of the video tube rises.

As previously mentioned, the internal heat from the focusing and deflecting coils constitute a third source of heat. The stream of air in the convection path serves to distribute the heat to accomplish the desired end result. In order to modify the heating action, suitable flap valves 45 and 46 are provided for by-passing air from the outside ambient atmosphere over the parts to extract heat from the system as hereinafter pointed out.

Since the video pick-up tube 11 must operate over a wide range of pick-up distances, it is necessary to selectively place lens systems of different focal lengths before the image screen 13 of the tube. To this end, the video tube 11 is supported in a housing 35 which also serves as a support for a turret 51 rotatably mounted on the housing over the end of the tube 11. A plurality of lens systems 47, 48 and 49 of different respective focal lengths, generally represented at 20 in Fig. 3, are mounted in the turret 51. The space 52 between this turret and the end face of the tube constitutes an air passage included in the convection heating and ventilating path.

A suitable flexible seal 53 is provided to prevent leakage of the air.

The electrical circuit for the control of the heaters, the blower and the control of the air flow, is shown in Fig. 4. Three thermostats 42, 43 and 44 are provided for effecting the desired temperature control.

The heater 41 in the conduit housing 29 has two sections 41a and 41b. In the embodiment shown in Fig. 4 they are of the three-phase type. Section 41a is controlled by a relay 66 while section 41b is controlled by relay 67. A special control circuit is provided to insure that the target heater 26 is energized upon initiation of the operation of the equipment but is cut out at the appropriate time to prevent dangerous temperatures.

To this end, the contacts of thermostats 43 and 44 are in series in the energizing circuit for the relay 66. The relay 66 has three pairs of contacts for controlling heater section 41a and a separate pair of contacts for controlling heater 26. The contacts of the thermostat 42 are also in series with those of thermostats 43 and 44 and the relay 67 which controls section 41b of the heater 41.

Thermostat 42, which is located on the intake conduit to blower casing 31, is designed so that its contacts are closed for all temperatures below +25° C. and open above this temperature. Thermostat 43 located adjacent the front face of the video tube 11, is so designed that its contacts are closed below +37° C. and open above this temperature. Thermostat 44, located within the housing rack 35, which supports the video tube, to sense the temperature of the ambient air and adjacent the housing 29 which contains the heater 41, is designed so that its contacts are closed below +50° C. and open above this temperature. From the circuit diagram of Fig. 4 it will be apparent that for any temperature below +37° C. the relay 66 will be energized and its contacts will be closed so that target heater 26 and section 41a of the heater 41 will be energized. If the temperature is below +25° C. the contacts of thermostat 42 will also be closed energizing section 41b of heater 41 through the contacts of relay 67. If the power is applied all the heaters will be energized to bring the temperature of the tube quickly up to operating temperature. As soon as the temperature reaches +25° C. the contacts of the thermostat 42 will open, opening the energizing circuit of relay 67 to deenergize heater section 41b. A pair of special back contacts 50 of relay 67 are provided to serve as an electrical interlock to prevent operation of the lens-changing and light shutter mechanisms (not shown) until the video tube has reached normal operating temperature. These contacts also control the operation of the video transmitter.

As soon as the temperature reaches +37° C. thermostat 43 opens to deenergize the relay 66 and its contacts open to deenergize the target heater 26 and heater section 41a. The blower 40 is connected directly to the three phase power lines so that it is in operation at all times that power is supplied to the tube 11 and it continues to circulate the enclosed heated air through the closed loop to maintain the limited temperature differential previously mentioned. If the ambient temperature is such that the heat loss from the system is not in excess of the internal heat developed, the temperature of the tube 11 will continue to rise and at +50° C. thermostat 44 will open thus deenergizing a rotary solenoid 68 and its biasing spring will move flapper valve 45 to the dotted position to exhaust air to the atmosphere at outlet 76. The movement of this valve 45 to this position closes a switch 71 which energizes a similar rotary solenoid 72 to open flap valve 46 to cause the blower 40 to pull in outside air at inlet 74. The sequential operation of the flapper valves is desirable because opening of valve 45 first reduces the pressure on it that would be caused if valve 46 were opened first and makes for easier operation of the valves.

It will be noted from the circuit diagram that in the event of failure of the blower, radiation from the heater 41 in the housing 29 would open thermostat 44 which in turn opens one side of a circuit common to both relays 66 and 67 thus deenergizing all heaters and operating the valves.

The temperature control system of this invention relies upon heat exchange by a combination of radiation, convection and conduction. The target heater 26 supplies a part of its heat directly to the envelope of the video pick-up tube 11 and the remainder is given up to the convection air stream moved by the blower fan through the conduits 28, 29 which encloses the auxiliary heater 41. This heater supplies the major portion of the heat energy to the convection air stream which is circulated over the full length of the tube 11 between the latter and the deflection and focusing coils. The heat from the three separate sources of heat, namely, the target heater 26, main heater 41 and the deflection and focusing coils, located at the three separated points in the circulating loop is combined to quickly bring the temperature of the tube 11 up to operating temperature while at the same time preventing any points of destructively high temperatures or any great temperature differentials within the tube which might cause undesirable migration of the photosensitive cesium metal vapor. The rate of heat transfer by convection is dependent upon the pounds of air moved and not upon the volume of the air. Therefore, by causing the stream of air to scrub over the surface of the tube 11 in intimate contact therewith and over the devious path shown by the arrows a substantial pressure is produced which increases the pounds of air scrubbing over the surface of the tube 11. As the air emerges from the confined space around the enlarged left hand end of the tube 11, the air will expand and increase in velocity, thus increasing its heat absorption capacity. The heater 26 delivers part of its heat directly to the tube 11 by conduction and radiation yet the convection currents keep the tube from developing localized spots of excessively high temperature.

By locating the blower adjacent the turret face the air will be in an expanded condition and therefore relatively cool. This gives protection to the bearings and motor of the blower which is enclosed within the housing. Since the main heater 41 in the housing 29 is between the blower and the restricted devious path between the tube and the coils surrounding it a slight increase in pressure will be developed in the area where heat is also supplied to the air. This heated air then strikes the right hand end of the tube 11 where there is less internal heat developed than in the opposite end of the tube. The important feature of this is that it keeps the entire length of the tube at substantially the same temperature to prevent any migration of the cesium vapor.

What is claimed is:

1. In combination with a video camera, a system for controlling the temperature of an elongated video pick-up tube which must be maintained at a proper operating temperature with a difference of temperature between any points within the tube, maintained within selected limits dependent upon the absolute temperature, said tube having an image section including a target and image screen, a scanning section including focusing and deflection coils closely surrounding said tube so that said tube is subjected to the heat loss from said coils, an electron gun and multiplier section, heater means surrounding said target section for heating said target and the image screen by conduction and radiation, convection path means including a blower and conduit for circulating convection air currents over said heater a main heater in the conduit on the exit side of said blower casing, a shroud having an air tight seal with the outer surface of said focussing coil and with the adjacent end of said video tube, a connection between the conduit housing said auxiliary heater and said shroud whereby the convection air currents are caused to pass through the annular cylindrical space between the focusing coil and deflection coils and between the latter and the tube to thereby continuously move the convection air currents in the direction from the electron gun section end toward the target section end of said tube.

2. In combination with a video camera, a system for controlling the temperature of an elongated video pick-up tube which must be maintained at a proper operating temperature with a difference of temperature between any points within the tube being maintained within selected limits dependent upon the absolute temperature, said tube having an image section including a target and image screen, a scanning section including focusing and deflection coils closely surrounding said tube so that said tube is subjected to the heat loss from said coils an electron gun and multiplier section, a housing for supporing said tube, a disc-like rotatable turret supported in spaced relation to said housing and having lens systems of different focal lengths adapted to be rotated into position in front of said image section, an air tight seal between said housing and said turret, heater means surrounding the target section of said tube for heating the latter by conduction and radiation, closed convection air path means including: a blower having its suction side connected to the annular space between said turret and said housing, a conduit connected to the exhaust side of said blower casing, said conduit containing an auxiliary heater, a casing shroud having an air tight seal with the electron gun section end of said video pickup tube and the outside of said focusing coil, an inlet opening to said casing shroud, said conduit being connected to said inlet connection to said shroud whereby convection air currents are forced between the deflection coils and the focus coil and between the latter and said tube in a scrubing action to thereby distribute the heat and circulate the air in the direction from the electron gun section toward the target section end of said tube where the air is permitted to expand as it passes over the end of the target section into the adjacent annular space from which the air is drawn by said blower.

3. In combination with a video camera, a system for controlling the temperature of an elongated video pick-up tube which must be maintained at a proper operating temperature with a difference of temperature between any points within the tube being maintained within selected limits dependent upon the absolute temperature, said tube having an image section including a target and an image screen, a scanning section including focusing and deflection coils closely surrounding said tube so that said tube is subjected to the heat loss from said coils, an electron gun and multiplier section, a plate-like member having an air tight seal with the target section end of said focus coil, an aperture in said plate-like member over the target section end of said tube, a turret including a second plate-like member in rotatably sealed engagement with said first plate-like member but spaced therefrom to provide a flat disc-like air space between said plate-like members, said second plate-like member carrying a plurality of optical lens systems adapted to be moved sequentially into position in front of said image section when said second plate-like member is rotated, heater means surrounding said target section for heating the latter by conduction and radiation, a second aperture in said first member, a blower having its intake connected to said aperture, an exhaust opening in said blower casing connected to a convection air path means including a main heater casing, a main heater in said casing, a T-junction between the outlet of said blower casing and said heater casing, a two-way valve pivotable for directing the air from the outlet of said blower alternately into said heater casing or to open atmosphere, a casing shroud having one side in sealed engagement with the outside of the electron gun section end of said focus coil, the other side of said shroud casing having an air tight seal with the electron gun section end of said tube, a second T-junction between the end of said heater casing away from said blower casing, a flap valve in said second T-junction pivotable to alternately direct air in a closed path through said casing shroud and to open said shroud to free atmosphere whereby convection of air currents are forced between the deflection coils and the focus coil and between the latter and said tube in a scrubbing action to thereby distribute the heat and circulate the air in the direction from the electron gun section end toward the target section end of said tube where the air is permitted to expand as it passes over the end face of the target section into the adjacent annular space from which the air is drawn by said blower.

4. In combination with a video camera, a system for controlling the temperature of an elongated pick-up tube which must be maintained at a proper operating temperature with a difference of temperature between any points within the tube being maintained within selected limits dependent upon absolute temperature, said tube having an image section including a target and an image screen, a scanning section including scanning and deflection coils closely surrouding said tube, an electron gun and multipler section, a housing for supporting said tube, a disc-like rotatable turret supported in spaced relation to said housing and having lens systems of different focal lengths adapted to be rotated into position in the front of said image section, an air tight seal between said housing and said turret, a heater surrounding the target section of said tube for heating the latter by conduction and radiation and adapted to be energized from a first source of electrical power, convection air path means including: a blower having its suction side connected to the annular space between said turret and said housing, a conduit connected to the exhaust side of said blower casing, said conduit containing a two section main heater adapted to be energized from a second source of power, a T-junction between the outlet of said blower casing and said heater conduit, a two-way valve pivotable for alternately directing the air from the outlet of said blower into said auxiliary heater casing or to open atmosphere, a casing shroud having an air-tight seal with the electron gun section end of said video pick-up tube and with the outside of said focusing coil, an air inlet connection to said casing shroud, a second T-junction between the end of said heater conduit away from said blower casing and said inlet connection to said casing shroud, a pivotable valve in said second T-junction to alternately direct recirculated air into said inlet connection and to open said second T-junction to allow outside air to be drawn into said inlet connection to said casing shroud, whereby convection air currents are caused to flow between the focus coil and the deflection coils and between the latter and said tube in a scrubbing action to thereby distribute the heat and circulate the air in the direction from the electron gun section end toward the target section end of said tube where the air is permitted to expand as it passes over the end face of the target section into the adjacent annular space from which the air is drawn by said blower, respective electrical means energized through a common side of an electric circuit from said first source of electrical power for controlling the energization of each section of said main heater from said second source, first thermostatic means in the non-common leg of said circuit for deenergizing one of said heater sections and said target heater at a selected temperature, second thermostatic means deenergizing the second heater section at a higher temperature than that at which said first thermostatic means operates, third thermostatic means for operating said flap valve in said second T-joint to open said conduit to the outside atmosphere and close the part of the conduit containing said main heater, and electric means responsive to the operation of the flap valve in said second T-junction to open said first flap valve to thereby open said conduit to free atmosphere.

References Cited in the file of this patent

UNITED STATES PATENTS

| | | |
|---|---|---|
| 1,978,589 | McFarlane | Oct. 30, 1934 |
| 2,342,778 | Wolff | Feb. 29, 1944 |
| 2,681,947 | Jackson et al. | June 22, 1954 |